US007185711B2

(12) United States Patent
Jackson et al.

(10) Patent No.: US 7,185,711 B2
(45) Date of Patent: Mar. 6, 2007

(54) FIRE PROTECTION SYSTEM

(75) Inventors: Eldon D Jackson, Hastings, MI (US); Vinh Boa Hoa, Grand Rapids, MI (US)

(73) Assignee: The Viking Corporation, Hastings, MI (US)

( * ) Notice: Subject to any disclaimer, the term of this patent is extended or adjusted under 35 U.S.C. 154(b) by 0 days.

(21) Appl. No.: 11/257,250

(22) Filed: Oct. 24, 2005

(65) Prior Publication Data

US 2006/0090908 A1 May 4, 2006

Related U.S. Application Data

(62) Division of application No. 10/438,726, filed on May 15, 2003.

(60) Provisional application No. 60/381,315, filed on May 17, 2002.

(51) Int. Cl.

| | |
|---|---|
| ***A62C 35/00*** | (2006.01) |
| ***A62C 37/36*** | (2006.01) |
| ***A62C 2/00*** | (2006.01) |
| ***A62C 37/00*** | (2006.01) |
| ***A62C 37/10*** | (2006.01) |
| ***F16K 17/38*** | (2006.01) |

(52) U.S. Cl. ............................ 169/46; 169/16; 169/17; 169/19; 169/56; 169/60; 169/61; 137/79; 137/80

(58) Field of Classification Search .................. 169/17, 169/16, 19, 56, 60, 61, 5, 20, 22, 23, 46, 169/57; 137/79, 80, 78.5

See application file for complete search history.

(56) References Cited

U.S. PATENT DOCUMENTS

| | | | | |
|---|---|---|---|---|
| 2,265,810 A * | 12/1941 | Lowe et al. | .................. | 169/16 |
| 2,342,589 A | 2/1944 | Lewis | .......................... | 169/19 |
| 3,401,751 A * | 9/1968 | Loftin et al. | .................. | 169/17 |
| 3,958,643 A | 5/1976 | Landsberg | ................... | 169/43 |
| 4,305,469 A * | 12/1981 | Morrisette | ................... | 169/61 |
| 4,356,868 A * | 11/1982 | Bentley et al. | ............... | 169/26 |
| 5,099,925 A | 3/1992 | Glidden et al. | ............... | 169/17 |
| 5,236,049 A | 8/1993 | Asselin et al. | ................ | 169/61 |
| 5,720,351 A | 2/1998 | Beukema et al. | ............. | 169/61 |
| 5,971,080 A | 10/1999 | Loh et al. | ...................... | 169/43 |
| 5,992,532 A | 11/1999 | Ramsey et al. | ............... | 169/46 |
| 6,068,057 A | 5/2000 | Beukema | ..................... | 169/22 |
| 6,158,520 A | 12/2000 | Reilly et al. | .................. | 169/17 |
| 6,357,531 B1 | 3/2002 | Asselin | ........................ | 169/17 |
| 2002/0003042 A1 | 1/2002 | Reilly | ......................... | 169/16 |
| 2002/0011342 A1 | 1/2002 | Reilly | ......................... | 169/16 |

* cited by examiner

*Primary Examiner*—Kevin Shaver
*Assistant Examiner*—Darren Gorman
(74) *Attorney, Agent, or Firm*—Harness, Dickey & Pierce, P.L.C.

(57) ABSTRACT

A fire suppression system includes system piping and at least one sprinkler with the system piping for delivering fire suppressant to the sprinkler. The sprinkler has an outlet and a temperature sensitive trigger with temperature sensitive trigger opening the outlet for dispersing fire suppressant when sensing temperatures associated with a fire condition. The system also includes a deluge valve that is in selective fluid communication with the system piping and has a normally closed condition whereby the system piping is normally dry. The deluge valve controls the flow of suppressant to the system piping and the sprinkler. A control system, which is in communication with at least one source of power, opens the deluge valve in a fire condition when the power source is in a powered condition and opens the deluge valve in a loss of pressure condition when the power source is in a loss of power condition.

7 Claims, 7 Drawing Sheets

| | | ACTION A=ALARM T=TBL L=LATCH N=NORMAL S=SUPV | | | | OUTPUT CIRCUITS NOTE 2 | | | | | | RELAY MODULE NOTE 2 | | | | | |
|---|---|---|---|---|---|---|---|---|---|---|---|---|---|---|---|---|---|
| | INPUT CIRCUITS | TYPE | OPEN | EOLR NOTE 3 | SHORT | ALARM BELL | REMOTE TROUBLE HORN | RELEASE SOLENOID 1 | RELEASE SOLENOID 2 | ALARM RELAY | TROUBLE RELAY | ALARM RELAY | SUPERVISORY RELAY | RELEASE 1 RELAY | RELEASE 2 RELAY | ALARM RELAY | TROUBLE RELAY |
| 1 | DETECTOR CIRCUIT 1 | L | T | N | A | X | | X | | X | T | X | | X | | X | T |
| 2 | DETECTOR CIRCUIT 2 | L NOTE 1 | T | N | A | X | | | X | X | T | X | | | X | X | T |
| 3 | WATERFLOW | L | T | N | A | X | | | | X | T | X | | | | X | T |
| 4 | SUPERVISORY | L | T | N | S | | X | | | | T | | X | | | | T |
| 5 | ALARM ACTIVATE SWITCH | L | | | | X | | | | X | | X | | | | X | |

NOTE 1: DETECTION CIRCUIT 2 CAN BE SET FOR TIMED SHUT-OFF. SEE OWNERS MANUAL FOR PROPER SETTING OF DIP SWITCHES. TIMER STARTS AT DETECTOR CIRCUIT 2 TRANSISTION. TIMEOUT SHUTS OFF RELEASE SOLENOID. DETECTOR CIRCUIT 1 DOES NOT OVER-RIDE TIMER SHUT-OFF WITH THIS MODE OF OPERATION.

NOTE 2: X IN TABLE DENOTES PANEL OUTPUT ON ALARM OR SUPERVISORY SIGNAL. T IN TABLE DENOTES PANEL OUTPUT ON TROUBLE CONDITION.

NOTE 3: ON FOUR WIRE CONNECTIONS, END-OF-LINE RESISTOR IS BUILT-IN. A FIELD INSTALLED DEVICE IS NOT REQUIRED.

FIG. 3

FIG. 6

| | INPUT CIRCUITS | ACTION A=ALARM T=TBL L=LATCH N=NORMAL S=SUPV | | | | OUTPUT CIRCUITS NOTE 2 | | | | | | RELAY MODULE NOTE 2 | | | | | |
|---|---|---|---|---|---|---|---|---|---|---|---|---|---|---|---|---|---|
| | | TYPE | OPEN | EOLR NOTE 3 | SHORT | ALARM BELL | REMOTE TROUBLE HORN | RELEASE SOLENOID 1 | RELEASE SOLENOID 2 | ALARM RELAY | TROUBLE RELAY | ALARM RELAY | SUPERVISORY RELAY | RELEASE 1 RELAY | RELEASE 2 RELAY | ALARM RELAY | TROUBLE RELAY |
| 1 | DETECTOR CIRCUIT 1 | L | T | N | A | X | | X | | X | T | X | | X | | X | T |
| 2 | DETECTOR CIRCUIT 2 | L NOTE 1 | T | N | A | X | | | X | X | T | X | | | X | X | T |
| 3 | WATERFLOW | L | T | N | A | X | | | | X | T | X | | | | X | T |
| 4 | SUPERVISORY | L | T | N | S | | X | | | | T | | X | | | | T |
| 5 | ALARM ACTIVATE SWITCH | L | | | | X | | | | X | | X | | | | X | |

NOTE 1: DETECTION CIRCUIT 2 CAN BE SET FOR TIMED SHUT-OFF. SEE OWNERS MANUAL FOR PROPER SETTING OF DIP SWITCHES. TIMER STARTS AT DETECTOR CIRCUIT 2 TRANSISTION. TIMEOUT SHUTS OFF RELEASE SOLENOID. DETECTOR CIRCUIT 1 DOES NOT OVER-RIDE TIMER SHUT-OFF WITH THIS MODE OF OPERATION.

NOTE 2: X IN TABLE DENOTES PANEL OUTPUT ON ALARM OR SUPERVISORY SIGNAL. T IN TABLE DENOTES PANEL OUTPUT ON TROUBLE CONDITION.

NOTE 3: ON FOUR WIRE CONNECTIONS, END-OF-LINE RESISTOR IS BUILT-IN. A FIELD INSTALLED DEVICE IS NOT REQUIRED.

FIRE PROTECTION SYSTEM

This application is a divisional application of U.S. patent application Ser. No. 10/438,726, filed May 15, 2003, entitled FIRE PROTECTION SYSTEM, by Applicants Eldon D. Jackson and Vinh Boa Hoa, which claims priority from U.S. provisional application Ser. No. 60/381,315, filed May 17, 2002, entitled FIRE PROTECTION SYSTEM, by Eldon D. Jackson, the entire disclosures of which are incorporated herein by reference in their entireties.

TECHNICAL FIELD AND BACKGROUND OF THE INVENTION

The present invention relates to a control system for a sprinkler system and, more particularly, to a control system for a preaction sprinkler system.

There are several types of preaction systems, but all preaction systems typically employ closed sprinklers in the sprinkler system piping. The detection system may be hydraulic, pneumatic, or electric and may be actuated manually or by detecting a temperature rise or by other means. Typically, the detection system operates before the sprinkler fuses and sounds an alarm. Preaction systems are used in areas where it is desirable to keep water intrusion to a minimum, such as areas that are subject to high potential water damage or freezing of the system piping.

Current technology requires continuous power to the various components that control the opening and closing of the flow control valve. For example, in the trim piping for some preaction systems, a normally open solenoid valve is used to control the pressure in the priming chamber of the system control valve. The solenoid valve must be powered closed during normal system operation. When a fire occurs, the solenoid valve is de-energized and opens to release the main sprinkler system control valve. However, this requires back-up power and a continuous power condition for the solenoid valve, which may result in a high-heat condition and possible failure due to sticking and/or failure of the electrical coil of the solenoid valve. In order to make these systems fail-safe, the system relies on a loss of power condition to release the main valve to allow the system to operate.

Consequently, there is a need for a preaction system that can fail-safe but which can operate in a no-power condition.

SUMMARY

Accordingly, the control system of the present invention provides a supervised fail-safe electric release control system for a preaction system that can operate in a low power or loss of power condition.

In one form of the invention, a fire suppression system includes system piping, with at least one sprinkler for dispersing fire suppressant when sensing temperatures associated with a fire condition and a deluge valve. The deluge valve is in selective fluid communication with the system piping and has a normally closed condition whereby the system piping is normally dry. The fire suppression system further includes at least one normally open fire detector, which is adapted to detect temperatures associated with a fire and has an open no-fire condition state and a closed fire condition state and generates a fire condition signal when in the closed fire condition state. A control system is provided that monitors the pressure in the system piping and is in communication with the fire detector, a source of power, the deluge valve, and the system piping. The control system is adapted to actuate the deluge valve to open in response to a fire condition signal and a low pressure condition in the system piping. The control system includes a pneumatic actuator that is adapted to detect a drop in pressure in the system piping and to actuate the deluge valve between the closed condition and an open condition when the pneumatic actuator detects a drop in pressure in the system piping and when the control system experiences a loss of power from the source of power. The control system also includes a shut-off valve in communication with the deluge valve that is adapted to latch the deluge valve open once the deluge valve opens until manually shut-off.

In one aspect, the deluge valve includes an inlet chamber, an outlet chamber, a priming chamber, and a clapper assembly. The inlet chamber and the outlet chamber are separated from the priming chamber by the clapper assembly. The deluge valve further includes a priming line in fluid communication with the inlet and the priming chamber, which pressurizes the priming chamber. The clapper assembly opens the deluge valve in response to pressure in the priming chamber, with the control system controlling the flow from the priming line to the priming chamber to open the deluge valve.

In other a further aspect, the priming line includes at least one solenoid valve, which is actuated by the control system to open the deluge valve. Preferably, the priming line includes a second solenoid valve, with one of the first solenoid valve and the second solenoid valve comprising a normally closed solenoid valve and another of the first solenoid valve and the second solenoid valve comprising a normally open solenoid valve to control the flow of fire suppressant through the priming line. The control system actuates the normally open solenoid valve to close and the normally closed solenoid valve to open in response to the fire condition signal.

In another form of the invention, a fire suppression system includes a fire suppressant supply line, system piping, a pressure supervisory system, which monitors pressure in the system piping, and at least one sprinkler for dispersing fire suppressant when sensing temperatures associated with a fire condition. The fire suppression system also includes a control valve, which is in fluid communication with the system piping and the supply line. The control valve has a normally closed condition but is opened when a low pressure condition in the system piping and a fire condition occur. The fire suppression system further includes at least one fire detector, which is adapted to detect temperatures associated with a fire, and a control system, which is in communication with a power source, the fire detector, the pressure supervisory system, and the priming line. The control system is adapted to control the flow of suppressant in the priming line to open the control valve when detecting a fire condition signal and a low pressure condition in the system piping and, further, is adapted to open the valve when the power source is in a power loss state in response to a low pressure condition in the system piping. Preferably, the control system is also adapted to latch the valve open when the valve opens requiring manual closing of the valve.

In one aspect, the control system includes a shut-off valve to latch the control valve open when the control valve opens.

According to yet another form of the invention, the flow of fire suppressant from a fire suppression supply to sprinkler system piping is controlled by providing a deluge valve, which has a normally closed condition. The pressure in the system piping is monitored to detect a low pressure condition in the system piping. The deluge valve is actuated when a low pressure condition and a fire condition is detected.

Furthermore, when opened, the deluge valve is latched open so that the deluge valve must be manually shut down.

Accordingly, the fire protection system of the present invention can operate in both a powered state or condition and a loss of power state or condition while still providing a normally dry system. In a powered state, the control system opens the sprinkler system piping control valve only in a fire condition (i.e. when a sprinkler opens and a fire detector is actuated). In a loss of power state, the control system only opens the control valve when there is a loss of pressure in the sprinkler system piping (i.e. when a sprinkler opens). Furthermore, the control system latches the control valve open, requiring manual closing of the control valve. These and other objects, advantages, purposes, and features of the invention will become more apparent from the study of the following description taken in conjunction with the drawings.

DETAILED DESCRIPTION OF THE DRAWINGS

FIG. 3 is a release panel function table of the control panel of FIG. 2;

FIG. 6 is a release panel function table of the control panel of FIG. 5.

DETAILED DESCRIPTION OF THE PREFERRED EMBODIMENTS

Figure 1:
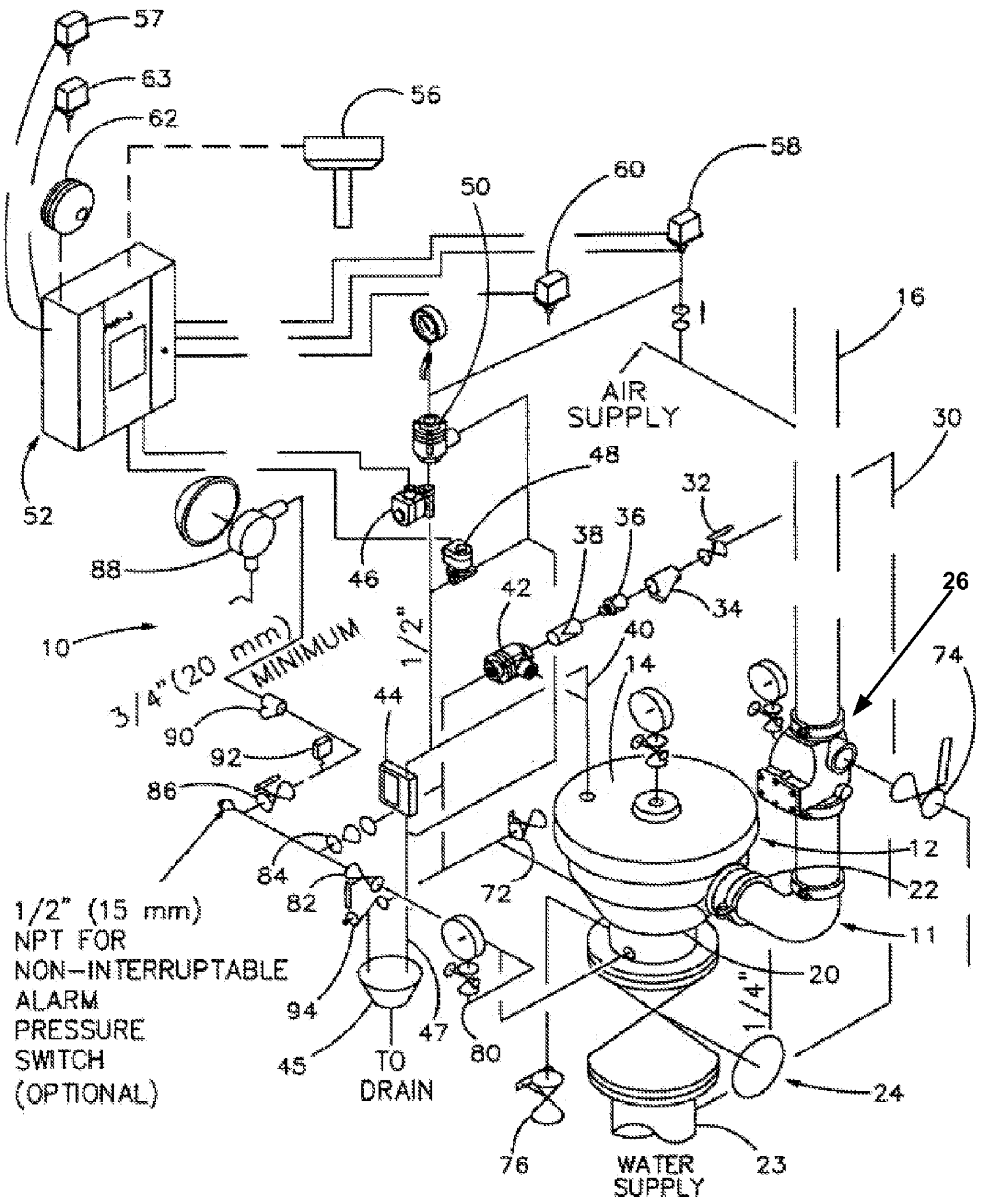
FIG. 1 is a piping diagram of the control system of a fail-safe preaction system of the present invention.

Referring to FIG. 1, the numeral 10 generally designates a control system of the present invention. As will be more fully described below, control system 10 is pneumatically pressurized to monitor the integrity of the sprinkler piping, fittings and sprinklers and acts as a fail-safe emergency backup to an electrical detection system. Control system 10 controls a preaction fire suppressant system in which the sprinkler piping system is normally dry and, therefore, may be installed in locations sensitive to water damage, such as an area subject to freezing. Control system 10 minimizes accidental water damage and, therefore, can be used in areas where detectors and/or sprinklers are easily damaged or broken. Furthermore, as will be more fully described, control system 10 may be used to control a preaction system 11 to provide a fire protection environment with or without electrical power.

Figure 1A:
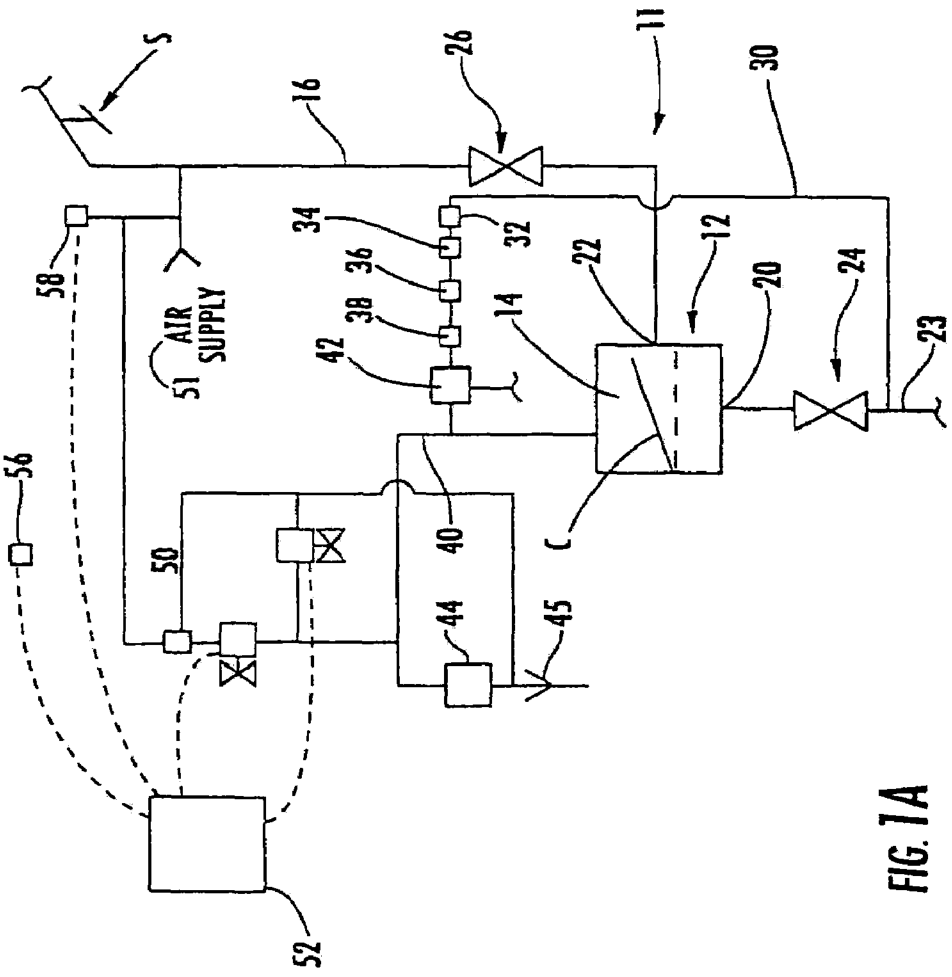
FIG. 1A is a schematic diagram of the control system of a fail-safe preaction system of the present invention.

Referring again to FIG. 1, control system 10 controls the pressure in the priming chamber (14) of valve 12 to open and close valve 12. When open, valve 12 delivers fire suppressant, such as water, to sprinkler system piping 16 and sprinklers (S, see FIG. 1A) of preaction system 11. Valve 12 includes an inlet 20 and an outlet 22, which is in communication with system piping 16. Hereinafter, reference will be made to water, though it should be understood that other fire suppressant fluids may be used. Water is delivered to inlet 20 from water supply 23 through a water supply control valve 24. Outlet 22 is connected to system piping 16 through a check valve 26, which restricts the flow of pressurized air from system piping 16 to valve 12 as will be more fully described below.

Valve 12 comprises a deluge valve and includes a body, which forms a passage between inlet 20 and outlet 22, and a movable clapper (C, see FIG. 1A) which moves between a first position (shown in phantom) in which the passage is blocked to thereby close the valve and a second position (shown in solid lines) in which the passage is open to permit flow of water from inlet 20 to outlet 22. Positioned above the clapper assembly is priming chamber 14. When priming chamber 14 is sufficiently pressurized, the clapper assembly is moved to its first or closed position to thereby close the valve. When pressure is released in the priming chamber, the clapper moves to its second position in which the passage is open to permit valve 12 to open. Further details of valve 12 are omitted, as valve 12 is conventional and available in a number of different configurations. Suitable deluge valves are available from The Viking Corporation of Hastings, Mich.

As best seen in FIG. 1, control system 10 includes a supply pressure priming line 30 with a normally open priming valve 32, a strainer 34, a restricted orifice 36, and a check valve 38. Priming line 30 supplies the system water supply pressure to the priming chamber 14 of valve 12 via priming outlet line 40 through a pressurized shut-off valve 42. Priming outlet line 40 is also connected through a normally closed emergency release 44 (such as a manually operated valve) to a drain 45. The flow of water through priming outlet line 40 is further controlled by a normally open solenoid valve 46 and a normally closed solenoid valve 48 and a pneumatic actuator 50. As will be more fully described below, solenoid valves 46 and 48 are actuated by a control panel 52 (FIG. 1). In a set condition, water supply pressure is trapped in the priming chamber 14 of valve 12 by check valve 38, normally closed emergency release 44, normally closed solenoid valve 48, and pneumatic actuator 50. The water supply pressure in the priming chamber holds the clapper assembly of valve 12 on the valve seat until the pressure is released.

In order to detect when a sprinkler is opened, system piping 16 is supervised by an air supply 51 and one or more supervisory pressure switches 58 and 60, which are in communication with control panel 52. As noted above, check valve 26 prevents the flow of pressurized air from system piping 16 to valve 12. Control panel 52 is also in communication with one or more normally open detectors 56, such as heat detectors, and optionally sounds an alarm 62 and further closes normally open solenoid valve 46 when detector 56 detects a fire condition as well a low pressure condition. In addition as noted, control panel 52 is in communication with pressure switches 58 and 60, which detect the supervisory pressure in system piping 16.

Pneumatic actuator 50 is also in communication with the supervisory air system that pressurizes sprinkler system piping and opens in response to a pressure drop in system piping 16. When the sprinklers operate in response to a fire, the system supervisory air is lost and pressure switches 58 and 60 are actuated. Normally after receiving both signals from the pressure switches 58 and 60 and from detector 56, control panel 52 energizes normally closed release solenoid valve 48 open so that pressure is released from priming chamber faster than it is supplied through restricted orifice 36. Water entering piping system 16 increases the pressure on pressurized shut-off valve 42, which shuts off the priming fluid to priming chamber 30 of valve 12 to thereby latch valve 12 open.

If system piping 16 and/or sprinklers are damaged and the AC power or the stand-by battery power is available, supervisory switch 58 will cause control panel 52 to activate alarm 62. In addition, normally open solenoid valve 46 will close to prevent valve 12 from opening and to prevent water flow from any of the open sprinklers. In the event of a fire, which will cause detector 56 to operate, control panel 52 will open normally closed release solenoid 48 so that the priming pressure will be released from priming chamber 14 and valve 12 will open and water will flow through the sprinkler system and through the sprinklers.

If there is a loss of power while the system is flowing water, normally open release solenoid valve 46 will open and normally closed release solenoid valve 48 will close. Since the pressurized shut-off valve 42 is already pressurized closed to prevent pressure in the chamber from building up, the water from the main water supply 23 will continue entering the fire protection system and through any open sprinkler.

Figure 2:
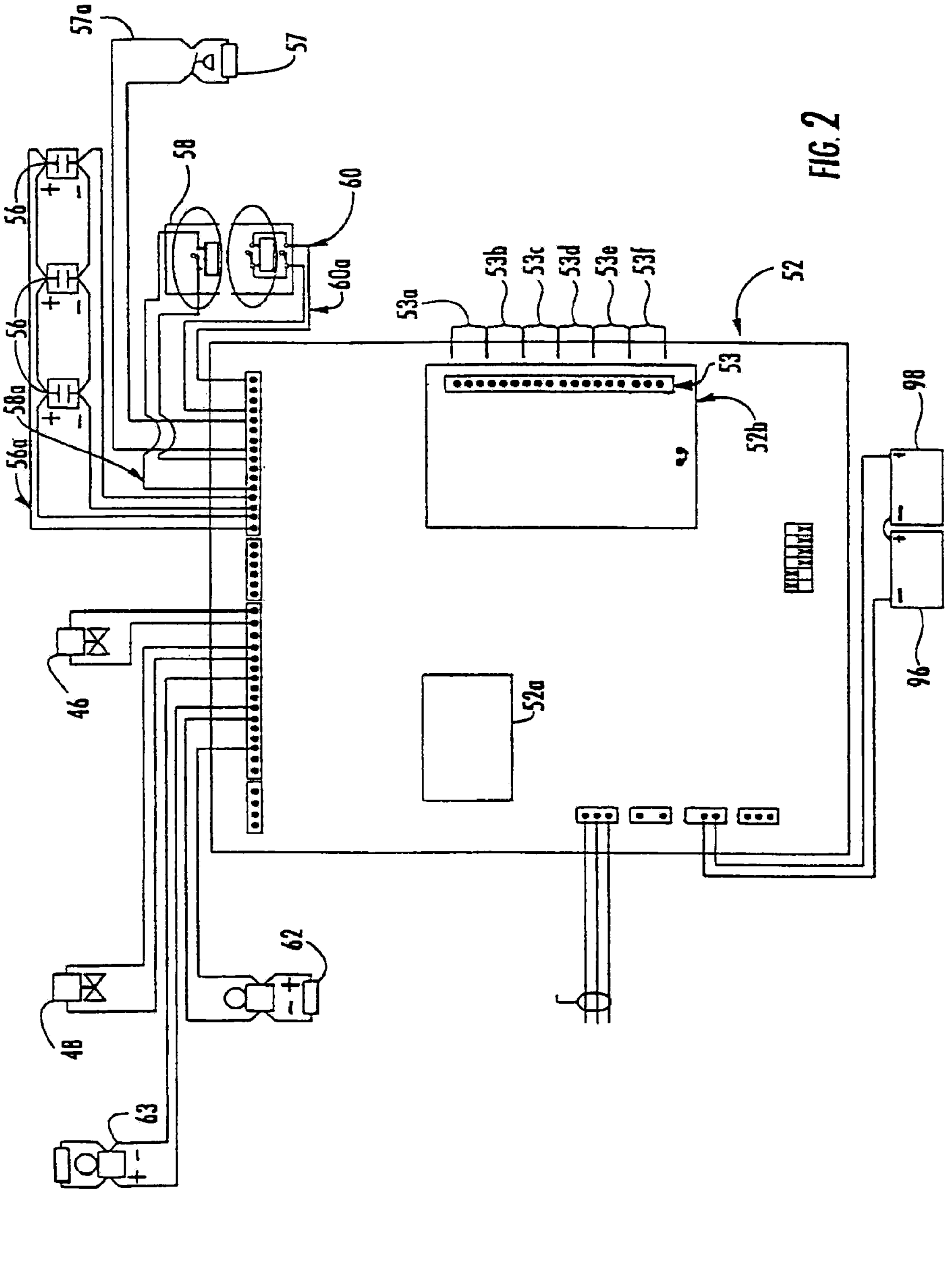
FIG. 2 is a schematic diagram of a control panel of the control system of FIG. 1.

If there is a loss of power prior to operation, control system 10 will continue to operate on stand-by batteries 96 and 98 (FIG. 2). Should the AC power and the stand-by batteries drop power to a point less than required to operate solenoid valves 46 and 48, solenoid valves 46 and 48 will fail respectively open and close. However, as long as air pressure remains in the system piping, pneumatic actuator 50 will keep valve 12 from opening. If the system air pressure is lost, valve 12 will open allowing water to flow into the sprinkler piping and be discharged from any open sprinklers.

As noted above, system 10 includes an emergency release 44. Emergency release 44 includes a handle, which when pulled permits the pressure from priming chamber 14 to be discharged through discharge line 47 to drain 45 so that valve 12 will open and water will flow in system piping 16, which will actuate any connected alarms, but will not be discharged from any closed sprinklers attached to the system until a sprinkler is operated such as by a fire.

In this manner, control system 10 provides an electric pneumatic control system which converts to a pneumatic system once power is lost.

After a system has been subjected to a fire, the entire system must be inspected for damage or possible repair or replacement as necessary. Typically, if all system components are operational, the system is drained by an auxiliary drain 72 and by a system drain valve 74. The inlet chamber of the valve 12 is drained by valve 76.

In order to test the system on a regular basis, system 10 includes a water supply pressure gage and valve 80 and a normally closed alarm test valve 82. The outlet of alarm test valve 82 is connected to a drain check valve 84' which is connected to the output of pressure operated shut-off valve 44. Test valve 82 is also connected in parallel to an alarm shut-off valve 86, whose outlet is connected to a water monitor alarm 88 through a strainer 90. Preferably, the piping connecting alarm shut-off valve 86 to water monitor alarm 88 includes an alarm pressure switch 92.

As noted above, solenoid valves are actuated by control panel 52. As best seen in FIG. 2, control panel 52 is in communication with first and second solenoid valves 46 and 48 as well as with one or more fire detectors 56, supervisory switches 58 and 60, and an optional water flow pressure switch 57 (FIG. 1). Fire detectors 56 may include, for example, conventional heat or smoke detectors, which preferably comprise open contact detectors that close to signal an alarm. Preferably, detectors 56 are chosen to have detection temperatures lower than the lowest temperature rated sprinkler being used. The sprinklers are preferably conventional heat triggered sprinklers and include a sprinkler body, which has an outlet, that is coupled and in fluid communication with the system piping 16. The sprinklers further include frames and temperature sensitive triggers, which are positioned between the outlets and the frames, which break or release to open the outlets upon detecting temperatures associated with a fire.

Control panel 52 is a microprocessor controlled releasing panel and includes a microprocessor **52*a* and at least one zone relay 52*b*. Zone relay module 52*b* preferably comprises a commercially available zone relay module 4XCM part from The Viking Corporation of Hastings, Mich. Zone relay module 52*b* includes six relay contacts 53, namely a detection contact 53*a*, a supervisory contact 53*b*, a release one contact 53*c*, a release two contact 53*d*, an alarm contact 53*e*, and a trouble contact 53*f*. Relay contacts 53 are actuated as follows. Detection relay contact 53*a* is actuated by detection circuits 56*a* or 58*a* or by water flow alarm switch circuit 57*a*. Detection circuit 56*a* includes one or more detectors 56. Supervisory relay contact 53*b* of zone relay module 52*b* is actuated by detection circuit 60*a*. Release one contact 53*c* is actuated by detection circuit 56*a*. The switch positions are shown in tabular form in FIG. 3A. Release two contact 53*d* is actuated by detection circuit 58*a*. Alarm relay contact 53*e* is actuated by detection circuits 56*a* or 58*a* or by optionally water flow switch circuit 57*a*. Trouble contact 53*f*** is actuated by a panel malfunction or fault in the field wiring.

Control panel 52 includes outputs for first and second solenoid valves 46 and 68 and for an alarm bell 62 and, optionally, a remote trouble signal 63. In addition, control panel 52 preferably includes stand-by batteries 96 and 98 so that the control panel 52 will remain operational in the event of a power failure. Microprocessor **52*a*, zone relay module 52*b***, and the various supporting circuitry are preferably mounted on common circuit board, for example, a 110-volt mother board part commercially available from The Viking Corporation of Hastings, Mich.

System Operation

Preaction system 11 preferably operates as a dry pipe system. As previously noted, solenoid valves 46 and 48 as well as pneumatic actuator 50 control the opening of control valve 12, with solenoid valves 46 and 48 controlled by control panel 52 and actuator 50 controlled by the drop in pressure in the system piping. Control panel 52 is activated to close normally open solenoid 46 and open normally closed solenoid valve 48 in response to detectors 56 closing and by supervisory pressure switches 58 and 60 indicating a low pressure condition in system piping 16.

In a normal operating condition, the water supply enters flow control valve 12 through inlet 20 of flow control valve 12 and the system water also enters priming chamber 14 of control valve 12 through the priming line 30. Solenoid valve 46 is normally open, and solenoid valve 48 is normally closed. Pneumatic actuator 50, however, is normally closed so that the priming fluid is trapped in priming chamber 14 by actuator 50, solenoid 48, and valve 38 in priming line 30. If a fire is detected by detector 56 (which should close before the sprinklers are actuated), control panel 52 will sound an alarm. When one or more sprinklers then operate, the supervisory pressure switches 58 and 60 will actuate control panel 52 to close solenoid valve 46 and open solenoid valve 48 so that valve 12 will open. Only when control panel 52 detects or receives both fire condition and low pressure signals will control panel 52 actuate solenoid valves 46 and 48.

If the AC power supply to control panel 52 fails, solenoid valves return to their non-energized normal states and valve 12 will open only when actuator 50 detects a loss of system pressure.

Once valve 12 opens, pressurized shut-off valve 42 closes to latch valve 12 in its open state until manually closed.

Figure 4:
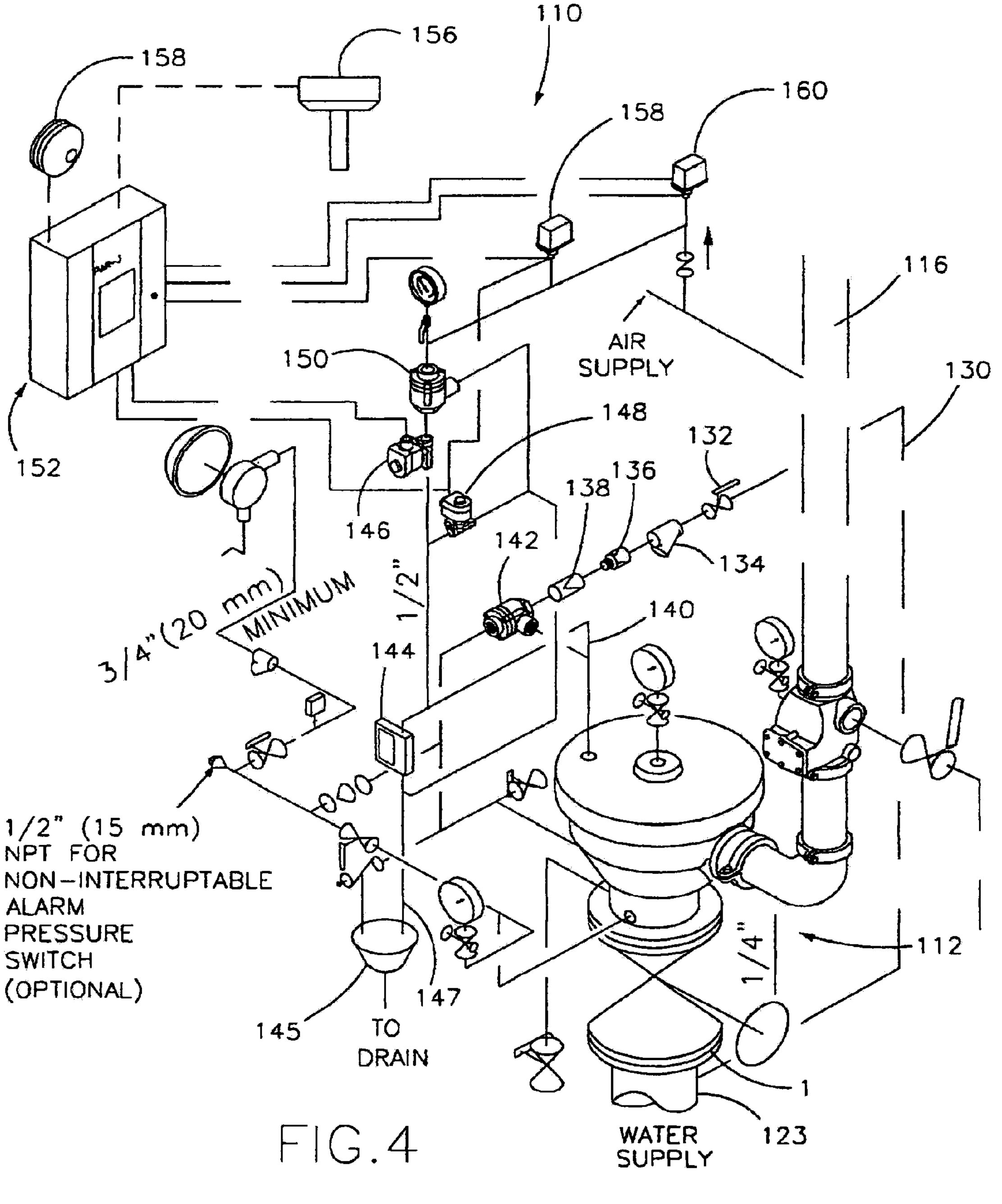
FIG. 4 is a schematic diagram of another embodiment of a control system of the present invention.

Referring to FIG. 4, the numeral 110 generally designates another embodiment of a control system for a fire protection system. The fire protection system includes a control valve 112, preferably a deluge valve, which controls the flow of water from a water supply 123 to sprinkler system piping 116, in a similar manner described in reference to the previous embodiment. In addition, similar to the previous embodiment, system piping 116 is pneumatically pressurized to monitor the integrity of the piping, fittings, and sprinkler and acts as a fail-safe emergency backup to the electrical detection system.

In the illustrated embodiment, control system 110 comprises a double interlocked fail-safe preaction control system which is also particularly suitable for use in an area where the environment is sensitive to water and, more particularly, in an environment where water can not flow into the sprinkler piping unless both the detector and the one or more sprinklers are operated, such as in the event of a fire.

Similar to the previous embodiment, supply water enters priming chamber 114 of valve 112 through a supply pressure priming line 130. Priming line 130 includes a priming valve 132, a strainer 134, a restricted orifice 136, and a check valve 138 whose outlet directs the flow of water through a priming outlet line 140 through a pressure operated shut-off valve 142. Priming outlet line 140 is also connected to a normally closed emergency release valve 144 and a normally open solenoid valve 146 and a normally closed solenoid valve 148. The pressure in priming outlet line 140 is maintained by check valve 138, emergency release valve 144, normally closed solenoid valve 148 and pneumatic actuator 150, similar to the previous embodiment. Solenoid valves 146 and 148 are in communication with control panel 152, which actuates solenoid valves 146 and 148 when control panel receives low-pressure signals from pressure switches 158 and 160 and a fire-condition signal from detector 156.

In a fire condition, control panel 152 activates an alarm 162, such as a pezio sounder, and initiates detection alarms. At this time, no water enters the sprinkler system piping. When a sprinkler operates, such as when detecting a temperature associated with a fire, switches 158 and 160 are actuated. Only when control panel 152 receives signals from switches 158 and 160 and, further, from detector 156, control panel 152 opens normally closed solenoid valve 148 and closes normally open solenoid valve 146. When solenoid valve 148 is open, pressure is released through pneumatic actuator 142, which opens and discharges the priming fluid through discharge line 147 in drain 145 in response to a low pressure condition in system piping 116.

If the system piping and/or sprinklers are damaged and either the AC power or the stand-by battery power is available, switches 158 and 160 will activate a trouble alarm when switches 158 and 160 detect a low-pressure in the supervisory air system. When the supervisory air drops below a pressure just above operation of pneumatic actuator 150, control panel 152 will activate a trouble alarm. The second pole of supervisory switch 160 activates normally open release solenoid valve 146 to close to prevent water flow through any open sprinkler. In the event of fire that causes the detector 156 to operate when air pressure drops below the trouble air setting, air supervisory switch 158, which is linked to normally closed solenoid valve 148, will actuate valve 148 to open. When the normally closed release solenoid valve 148 opens, water will flow through any open sprinkler.

If the detection system is damaged or malfunctions, control panel 152 will go into an alarm mode. In the event of fire, valve 112 will not open and emergency release 144 must be pulled in order to provide water through the opened sprinklers.

If the AC power fails, system 110 will continue to operate on the stand-by batteries. Should the stand-by batteries fail prior to operation system, all alarms will be lost. However, when the DC power drops to a point less than required to operate normally closed solenoid valve, both solenoid valves return to their normal states allowing normally open solenoid valve 146 to open and solenoid valve 148 to close. As long as air pressure remains in piping system 116, pneumatic actuator 150 will keep valve 112 from opening. If system air pressure is lost, valve 112 will open, allowing water to flow into system piping 116 and be discharged from any open sprinkler.

If all power fails while system 110 is flowing with water, normally open release solenoid valve 146 will open and normally closed release solenoid valve 148 will close. Since the pressurized shut-off valve 142 is already pressurized closed to prevent pressure in the chamber from building up, water from main supply line will continue entering system 116 through valve 112, thus requiring manual shut-down of the fire protection system.

Anytime emergency release valve 144 is actuated, pressure is released from priming chamber 114 of valve 112 faster than it can be replaced through priming line 130; therefore, valve 112 opens. While water enters system piping 116, the water will not be discharged until a sprinkler has operated, such as in the case of a fire.

It should be understood that since both fire protections systems of the present invention are normally dry, they may be installed in locations subject to freezing or in locations with equipment that is sensitive to water. In addition, systems 10 and 110 also provide excellent fire protection equipment with or without electrical power. Although the systems are equipped with backup batteries, which provide many hours of emergency power, the system will fail-safe and continue flowing until power is restored or the system is manually shut off. System 110 is particularly suitable where the environment is sensitive to water—where it is preferably that water can not flow into the system piping unless both a detector and sprinkler operates, such as in the case of a fire.

Figure 5:
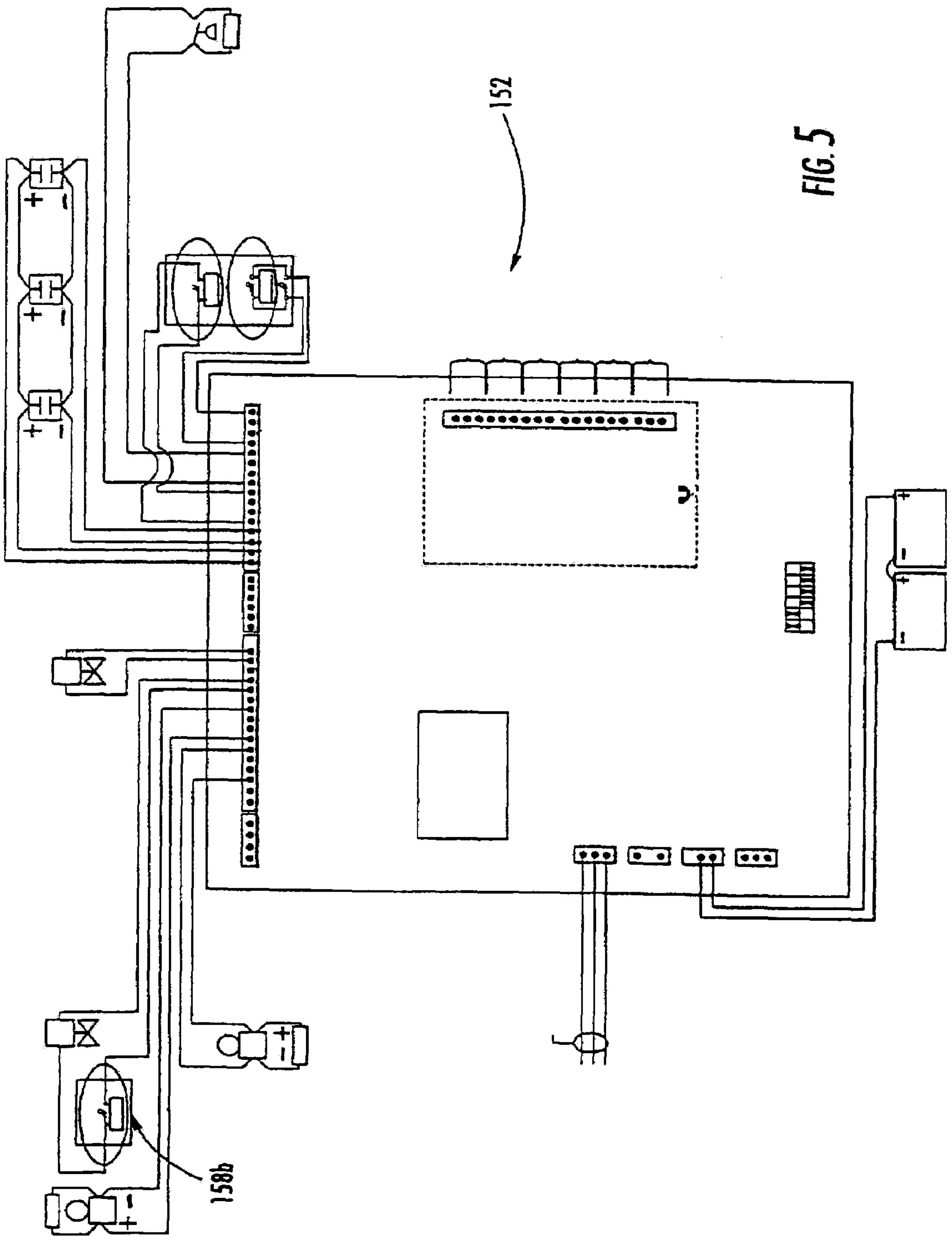
FIG. 5 is a schematic diagram of a control panel of the control system of FIG. 4.

Referring to FIGS. 5 and 6, control panel 152 is similar to control panel 52 but includes in the detection circuit 158*b* for solenoid 148 and a connection to air supervisory switch 158. Reference is therefore made to control panel 52 for the remaining details of control panel 152.

While several forms of the invention have been shown and described, other changes and modifications will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follows:

1. A method of controlling the flow of fire suppressant, said method comprising:

providing a preaction fire suppressant system, the fire suppressant system including a supply line and system piping, the system piping including at least one sprinkler and being supervised with air;

providing an electrical detection and control system;

detecting when a fire condition occurs and when the system piping experiences a loss of air pressure with the electrical detection system;

providing a pneumatic detection and control system;

detecting when the system piping experiences a loss of air pressure with the pneumatic detection and control system;

during a powered state, controlling the delivery of fluid to the system piping using only the electrical detection and control system and delivering fire suppressant from the supply line to the system piping only in the event of a fire condition and a loss of air pressure in the system piping;

during a non-powered state, controlling the delivery of fluid to the system piping using the pneumatic detection and control system and delivering fire suppressant from the supply line to the system piping only in the event of a loss of air pressure in the system piping;

wherein said providing a preaction fire suppressant system includes providing a control valve and said controlling the delivery of fluid to the system piping includes opening or closing the control valve to control the flow of fire suppressant fluid;

wherein said controlling the flow of fire suppressant includes maintaining the valve closed unless a fire condition and loss of air pressure in the system piping occurs during a powered state or unless a loss of air pressure in the system piping occurs during a non-powered state, said providing a valve includes providing a valve having an inlet, an outlet, a priming chamber, and a device that is operable to block the flow between the inlet and the outlet when the priming chamber is pressurized and operable to allow flow between the inlet and the outlet when pressure is released from the priming chamber, the valve including a priming line in fluid communication with the supply line and the priming chamber, and said maintaining the valve closed includes pressurizing the priming chamber with the priming line whereby the valve has a normally closed condition; and when in the powered state said controlling the flow of fire suppressant includes isolating the pneumatic detection and control system from the control valve during a loss of air pressure in the system piping and a fire condition.

2. The method according to claim 1, wherein said isolating includes isolating the pneumatic detection and control system from the control valve during a loss of air pressure in the system piping with the electrical detection and control system.

3. The method according to claim 2, wherein said isolating includes providing the electrical detection and control system with a normally open solenoid valve between the pneumatic detection and control system and the control valve, and closing and maintaining the normally open solenoid valve closed when a loss of air pressure is detected in the system piping and during a fire condition.

4. A method of controlling the flow of fire suppressant through a fire suppression system to system piping, said method comprising:

providing a valve;

coupling the valve to a fire suppressant supply and to system piping with a sprinkler, the valve having a normally closed condition;

pressuring the system piping with air;

detecting a loss of air pressure in the system piping with an electrical detection and control system and a pneumatic detection and control system;

detecting a fire condition with the electrical detection and control system;

when in a powered condition, actuating the valve to open when a fire condition is detected and a loss of air pressure in the system piping is detected using only the electrical detection and control system;

when in a non-powered condition, actuating the valve to open when a loss of air pressure in the system piping is detected using the pneumatic detection and control system; and wherein said actuating the valve to open when a fire condition is detected and a loss of air pressure in the system piping is detected using only the electrical detection and control system includes isolating the pneumatic detection and control system from the control valve at least in a fire condition.

5. The method according to claim 4, wherein said isolating includes isolating the pneumatic detection and control system from the control valve with the electrical detection and control system.

6. A fire suppression system comprising:

a fire suppressant supply line;

system piping with a sprinkler, said sprinkler opening when a fire condition occurs;

a pressure supervisory system monitoring air pressure in said system piping;

a control valve in fluid communication with said system piping and said supply line, said control valve having an inlet chamber, an outlet chamber, a priming chamber, and a device that is operable to block the flow between the inlet and the outlet when the priming chamber is pressurized and operable to allow flow between the inlet and the outlet when pressure is released from the priming chamber, said control valve including a priming line in fluid communication with said supply line and said priming chamber, said priming line being adapted to pressurize said priming chamber whereby said device closes said control valve wherein said control valve has a normally closed condition;

an electrical detection system adapted to detect a fire condition and adapted to detect a loss of air pressure in said system piping;

a pneumatic detection and control system adapted to detect a loss of pressure in said system piping;

an electrical control system in communication with said electrical detection system, when in a powered state said electrical control system using only said electrical detection system to control the flow of suppressant in said priming line to open said control valve when a fire condition signal and a loss of pressure in said piping system are detected; and when in a non-powered state, said pneumatic detection and control system controlling the flow of suppressant in said priming line to open said control valve when a loss of pressure in said piping system is detected by said pneumatic detection and control system; and wherein said pneumatic detection and control system is isolated from said valve in a powered state at least when a loss of pressure in said piping is detected.

7. The fire suppression system according to claim 6, wherein said electrical control system isolates said pneumatic detection and control system from said control valve.

* * * * *

UNITED STATES PATENT AND TRADEMARK OFFICE

CERTIFICATE OF CORRECTION

| | | |
|---|---|---|
| PATENT NO. | : 7,185,711 B2 | Page 1 of 1 |
| APPLICATION NO. | : 11/257250 | |
| DATED | : March 6, 2007 | |
| INVENTOR(S) | : Eldon D. Jackson and Vinh Boa Hoa | |

It is certified that error appears in the above-identified patent and that said Letters Patent is hereby corrected as shown below:

In col. 2, line 24, please delete “other”.
In col. 4, line 50 after “well” please insert --as--.
In col. 7, line 56, please delete “In” and insert --to-- therefor. (first occurrence)
In col. 8, line 48, please delete “preferably” and insert --preferable-- therefor.

Signed and Sealed this

Twenty-second Day of May, 2007

JON W. DUDAS
*Director of the United States Patent and Trademark Office*